(12) United States Patent
Staffaroni et al.

(10) Patent No.: US 9,460,740 B1
(45) Date of Patent: Oct. 4, 2016

(54) THERMAL ASSISTED MAGNETIC RECORDING SPOT-SIZE CONVERTER WITH FINITE RIDGE WIDTH

(71) Applicant: Headway Technologies, Inc., Milpitas, CA (US)

(72) Inventors: Matteo Staffaroni, San Ramoni, CA (US); Xuhui Jin, San Jose, CA (US); Weihao Xu, San Jose, CA (US); Jianing Zhou, Fremont, CA (US); Ya-An Yang, Fremont, CA (US); Dayu Zhou, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/880,385

(22) Filed: Oct. 12, 2015

(51) Int. Cl.
| | |
|---|---|
| *G11B 5/012* | (2006.01) |
| *G11B 5/48* | (2006.01) |
| *G02B 6/122* | (2006.01) |
| *F21V 8/00* | (2006.01) |
| *G02B 6/14* | (2006.01) |
| *G11B 5/60* | (2006.01) |
| *G11B 5/00* | (2006.01) |
| *G02B 6/12* | (2006.01) |

(52) U.S. Cl.
CPC ........... *G11B 5/4866* (2013.01); *G02B 6/0013* (2013.01); *G02B 6/0028* (2013.01); *G02B 6/1228* (2013.01); *G02B 6/14* (2013.01); *G11B 5/012* (2013.01); *G11B 5/6088* (2013.01); *G02B 2006/12152* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,098,547 B2 | 1/2012 | Komura et al. | |
| 8,264,919 B2 | 9/2012 | Komura et al. | |
| 8,411,536 B1 | 4/2013 | Peng | |
| 8,488,419 B1 | 7/2013 | Jin et al. | |
| 9,053,716 B1 | 6/2015 | Matsumoto et al. | |
| 2011/0122737 A1* | 5/2011 | Shimazawa | G11B 5/314 369/13.24 |
| 2015/0179197 A1 | 6/2015 | Clinton et al. | |

* cited by examiner

*Primary Examiner* — Brian Butcher
(74) *Attorney, Agent, or Firm* — Saile Ackerman LLC; Stephen B. Ackerman

(57) ABSTRACT

A thermally assisted magnetic recording head is disclosed having a spot size converter with at least one secondary waveguide adjoining a top or bottom surface of a primary waveguide. Each waveguide has tapered sides but the secondary waveguide is tapered at a greater angle over a shorter taper distance in order to couple propagated light into the primary waveguide before the front end of the taper. The secondary waveguide terminates in a ridge with a fixed width w3 of about 50-170 nm that is between the front end of the taper and the air bearing surface (ABS). The ridge enables transverse magnetic (TM) transmission mode efficiency above 90% even with a typical process misalignment in the cross-track and height directions. The primary waveguide has a front section with width w2 between an end of its tapered sides and the ABS where w2 is substantially larger than w3.

26 Claims, 10 Drawing Sheets

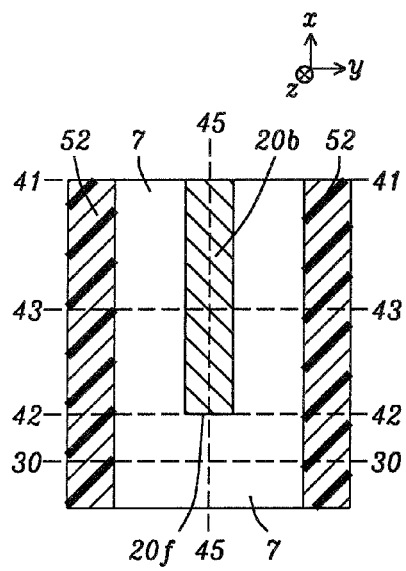 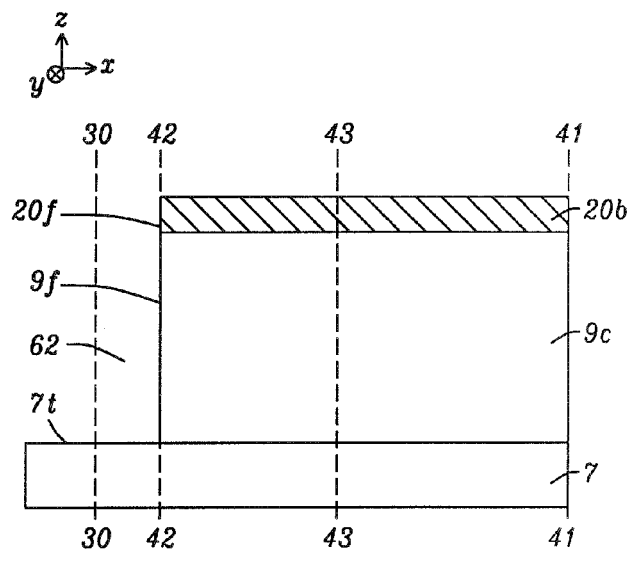
FIG. 16a    FIG. 16b
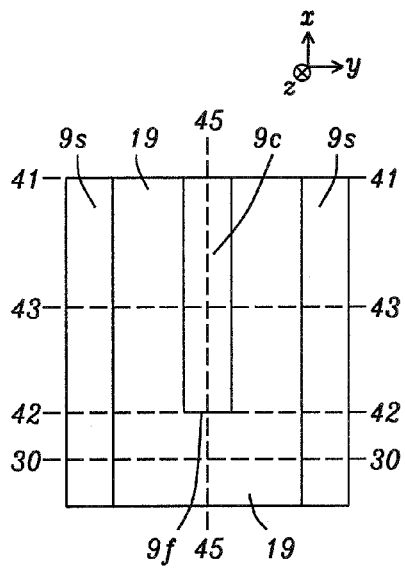 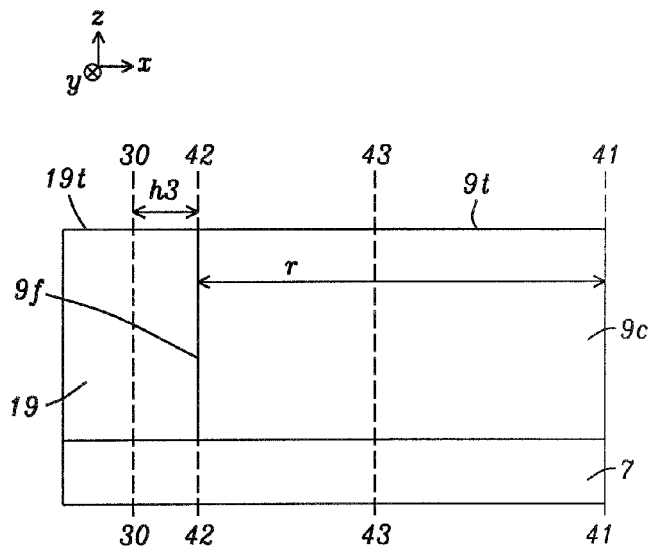
FIG. 17a    FIG. 17b

THERMAL ASSISTED MAGNETIC RECORDING SPOT-SIZE CONVERTER WITH FINITE RIDGE WIDTH

RELATED PATENT APPLICATIONS

This application is related to the following: U.S. Pat. No. 8,098,547; U.S. Pat. No. 8,264,919; and U.S. Pat. No. 8,488,419, which are assigned to a common assignee, and all herein incorporated by reference in their entirety.

TECHNICAL FIELD

The present disclosure relates to magnetic read/write heads based on thermally assisted magnetic recording (TAMR), and in particular to a waveguide structure with a spot-size converter portion in which one or more secondary waveguides are formed on a primary waveguide and are tapered in a cross-track direction to terminate in a ridge with a finite cross-track width in order to make a more reproducible taper tip size proximate to the air bearing surface (ABS).

BACKGROUND

TAMR is expected to be one of the future generations of magnetic recording technologies that will enable recording at ~1-10 Tb/in$^2$ data densities. TAMR involves raising the temperature of a small region of the magnetic medium to near its Curie temperature where both of its coercivity and anisotropy are significantly reduced and magnetic writing becomes easier to achieve even with weak write fields characteristic of small write heads in high recording density schemes. In TAMR, optical power from a laser diode is converted into localized heating in a recording medium during a write process to temporarily reduce the field needed to switch the magnetizations of the medium grains. Thus, with a sharp temperature gradient of TAMR acting alone or in alignment with a high magnetic field gradient, data storage density can be further improved with respect to current state of the art recording technology.

In addition to the components of conventional write heads, a TAMR head includes an optical waveguide (WG), and a plasmon generator (PG) that is also referred to as a near-field transducer. The waveguide serves as an intermediate path to guide light (from a laser diode mounted on the back of a slider) to the PG where the light optical mode couples to the propagating plasmon mode of the PG. After the optical energy is transformed to plasmon energy with energy transmission along the PG, it is concentrated at the medium location where heating is desired. Ideally, the heating spot is correctly aligned with the magnetic field from the write head to realize optimum TAMR performance.

Due to an inherent mode profile mismatch between the laser diode's far-field and the waveguide mode required to excite the near-field transducer, the waveguide's cross-sectional dimensions are commonly varied along the length of the slider so as to improve the coupling efficiency. The portion of the optical waveguide (WG) where the cross-sectional dimension changes along the light's propagation direction is typically called the spot-size converter. The spot-size converter usually includes multiple WG layers stacked on top of each other so that the total stack thickness is on the order of the laser diode spot size (around 1 micron). To achieve lateral confinement of light, the WG layers are tapered in the cross-track direction. For vertical confinement of light, all of the WG layers except the one (primary waveguide) that eventually terminates at the ABS, may be tapered in the cross-track direction to a tip with a very small cross-track dimension less than 100 nm to force the propagating light mode into the primary WG that extends all the way to the ABS. Unfortunately, current state of the art nanofabrication techniques cannot readily provide reproducible waveguide taper tips having widths of 50-100 nm or less at the required aspect ratios for typical TAMR spot-size converters. State of the art TAMR spot size converter schemes employ waveguide tapers that terminate in sharp tips. As a result, there is a large variability in spot-size converter size and efficiency from part to part.

Furthermore, TAMR sliders with low efficiency spot-size converters require a higher power output from the laser diode that causes excess heating from the laser diode, and lower reliability. Also, performance suffers from stray light that enters the slider but is not coupled through the spot size converter into the PG. Therefore, an improved WG spot-size converter is needed that is more amenable to current nanofabrication techniques so that the taper tip size is more reproducibly made to give higher yields of high efficiency TAMR devices.

SUMMARY

One objective of the present disclosure is to provide an improved spot-size converter in a waveguide structure for a TAMR device wherein a secondary waveguide tip that focuses propagating light into a primary waveguide near the ABS has a reproducible cross-sectional dimension.

A second objective of the present disclosure is to provide a method of fabricating the waveguide structure according to the first objective such that the secondary waveguide tip is produced with excellent process control.

These objectives are realized in various embodiments of the present disclosure wherein a TAMR write head structure includes a write pole that has a plasmon generator (PG) formed proximate to a leading edge of a pole tip region at the ABS. There is also an optical waveguide (WG) with a top surface that faces the PG such that the PG is between the WG and write pole in a down-track direction. The waveguide extends from the ABS in a lengthwise direction to a back end of a slider, and captures light from a laser diode that is mounted on the back end of the slider, and propagates the light toward the ABS. A portion of the light energy is transferred to the plasmon mode along the PG by evanescent coupling and is then propagated to the ABS and is evanescently coupled to a magnetic medium for spot heating during a write process.

A key feature of the present disclosure is the WG structure comprised of a primary waveguide that extends from the end of the slider to the ABS, and in a preferred embodiment, a secondary waveguide adjoining a bottom surface of the primary waveguide wherein a substantial portion of the WG structure serves as a spot size converter. In some embodiments, there may be another secondary waveguide formed on a top surface of the primary WG in addition to the secondary waveguide adjoining a bottom surface of the primary WG. In a preferred embodiment, the primary WG has a first rectangular section at the back end of the slider where a first end faces the laser diode, a second end having a cross-sectional width w1 faces the ABS and is parallel thereto, and two sides connecting the first and second ends where the two sides are formed perpendicular to the back end of the slider and ABS. The second end is a first distance (d1) from the first end. A second primary WG section is part of the spot-size converter and adjoins the ABS facing side of the first rectangular section, and has two tapered sides each formed at an angle α with respect to a first plane that includes a side of the first rectangular section. Each tapered side extends a distance d2 from a second plane formed parallel to the ABS (and including the second end) to a third plane formed parallel to the ABS and located a first height (h1) therefrom. The second primary WG section has a cross-sectional width (w2) at the third plane where w2<w1. There is a third primary waveguide section that couples light to the PG and is formed between the third plane and the ABS, and has a cross-track width w2 at the ABS. Preferably, all sections of the primary WG have a down-track thickness t1 in the range of 250 to 400 nm, and w2 is from 400 nm to 800 nm.

According to one embodiment where there is a single secondary WG, the secondary WG has a first section adjoining a bottom surface of the primary waveguide that faces away from the PG. The first section is rectangular shaped and has a cross-sectional width w1 with two sides each formed along one of the first planes, a back end at the back end of the slider and a front end at the second plane. The secondary WG has a second section that is a second part of the spot-size converter. The second section adjoins a bottom surface of the second primary WG section, and has two tapered sides each formed at an angle β with respect to a first plane where β>α. The two tapered sides terminate at a fourth plane formed parallel to the third plane wherein the fourth plane is a second height (h2) from the ABS. In some cases, h2>h1 although the present disclosure anticipates a design where h1≥h2. The secondary waveguide has a rectangular shaped third section called a ridge that adjoins a front end of the second section and extends a distance of 100 nm to 5 microns from the fourth plane toward the ABS. An important feature of the ridge is the ABS facing side which has a cross-track width w3 of about 50 to 170 nm where w3<w2. Width w3 is sufficiently large so that the ridge is reliably reproduced in a write head fabrication scheme, and yet small enough to force propagating light therein into the primary waveguide before reaching the fourth plane. The secondary waveguide preferably has a constant thickness t2 in a down-track direction where t2>t1, and the ABS facing side of the ridge is a third height (h3) from the ABS.

According to a second embodiment, the waveguide structure of the first embodiment further includes another secondary waveguide, which adjoins a top surface of the primary waveguide. Preferably, the two secondary waveguides each have three sections with dimensions as previously described with regard to the first embodiment except the thickness for each secondary waveguide is about ½ t2 to maintain a total waveguide thickness (t1+t2) on the order of the laser diode spot size at the slider back end. Therefore, the spot-size converter of the second embodiment is stacked structure wherein the primary waveguide is sandwiched between two secondary waveguides each having tapered sides formed at an angle β with respect to a first plane where β>α, and α is the angle formed by each tapered side of the second primary WG section with respect to the first plane.

The present disclosure is also a method of fabricating a waveguide structure having a spot-size converter as defined herein. According to one scheme where the primary WG is formed between the secondary WG and the PG, a secondary waveguide layer is deposited on a substrate such as a dielectric layer (oxide), and is patterned by a standard sequence of steps to form three sections in which the first and second sections have rectangular and tapered shapes, respectively, as described in the first embodiment. At this point, the third section has an intermediate rectangular shape wherein the lengthwise dimension extends all the way to the eventual ABS and the cross-sectional width is considerably greater than the desired w3. A key feature of the fabrication method is narrowing the cross-sectional width to w3 and forming an ABS facing end that is recessed a third height (h3) from the ABS.

A metal mask (MM) is formed on a top surface of the third section of the intermediate secondary WG. Next, a photoresist layer is coated on the MM and is patterned to form a line having a width of about 200 nm, and aligned orthogonal to the ABS plane. Thereafter, a reactive ion etch (RIE) is employed to shrink the line to the desired width w3. An ion beam etch (IBE) is then used to transfer the photoresist line shape through the MM. The photoresist layer is removed by a standard technique. A second photoresist is then coated and patterned to define the spot-size converter ridge end position at distance h3 from the ABS plane. Then a second IBE process is followed to remove an exposed portion of the MM line near the ABS plane, and the second photoresist is stripped. The remaining MM layer is used as a mask to protect underlying portions of second WG layer as the MM pattern is transferred through the second WG layer with a second RIE step. Thereafter, a side cladding layer is deposited that also fills the opening between the ridge end and ABS plane, and a chemical mechanical polish (CMP) process is performed to remove the remaining MM layer and make a top surface of the secondary WG coplanar with the side cladding layer. In subsequent processing, the primary WG, PG, and write pole are sequentially formed on the secondary WG.

BRIEF DESCRIPTION OF THE DRAWINGS

FIGS. 12a-17a are top-down views of a process sequence used to fabricate a spot size converter according to an embodiment of the present disclosure.

FIGS. 12b-17b are down-track cross-sectional views of the process sequence used to fabricate a spot size converter according to an embodiment of the present disclosure.

DETAILED DESCRIPTION

The present disclosure is a spot size converter comprised of a primary waveguide and at least one secondary waveguide where the latter is tapered in the cross-track direction and terminates at a ridge having a finite width in the cross-track direction and recessed a certain distance from the ABS. The ridge is reliably reproduced by a process sequence described herein and is responsible for efficient coupling of propagated light into the primary WG that extends to the ABS. In all drawings, the y-axis is the cross-track direction, the z-axis is the down-track direction, and the x-axis extends orthogonal to the ABS and towards a back end of the slider on which the TAMR head including the waveguide structure is formed.

Referring to FIGS. 1-4, various views are provided of a portion of a TAMR head with a waveguide and plasmon generator (PG) that was previously disclosed by the inventors in related U.S. Pat. No. 8,488,419 wherein the PG is comprised of a metal peg 12 and an overlying metal layer 11. Peg 12 is one of Au, Cu, Ru, Cr, Pd, Pt, Ti, W, Ta, Fe, Co, Ni, or alloys thereof to provide low atom mobility, good thermal robustness and mechanical hardness, and superior resistance to corrosion. Metal layer 11 is comprised of Au, Cu, Ag, or alloys thereof for excellent optical efficiency. As a result, the PG has improved performance and durability over earlier PG structures. According to one embodiment of the present disclosure, the aforementioned PG design is implemented in a TAMR head with a multilayer waveguide described herein. However, it should be understood that other PG structures are compatible with the waveguide design in this disclosure.

Figure 1:
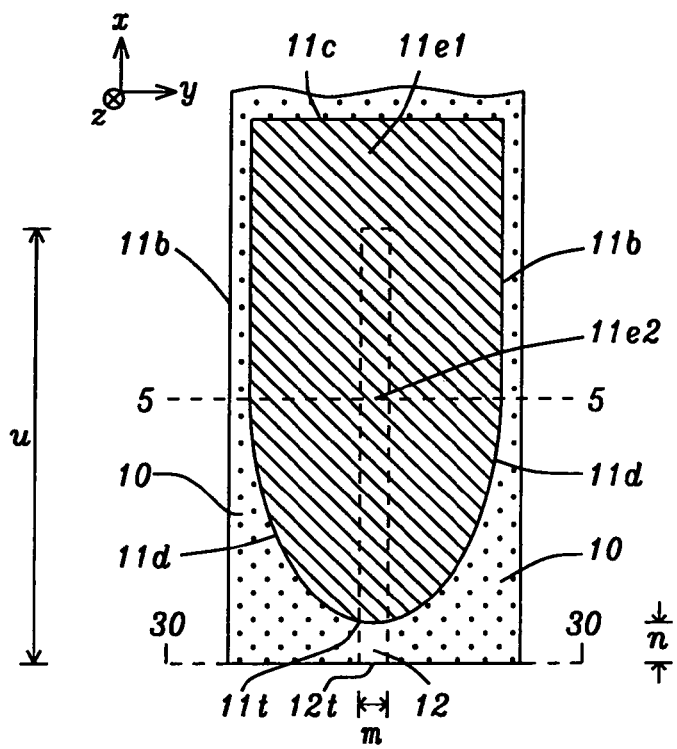
FIG. 1 is a top-down view of a plasmon generator (PG) structure formed on a waveguide according to a process of record employed by the inventors.

With regard to the top-down view in FIG. 1 where overlying layers including the write pole have been removed, metal peg 12 has a rod-like appearance with a rectangular shape having a width m in a cross-track direction along the y-axis, a lengthwise dimension u of up to 2 microns along the x-axis, and a front end (tip) 12t at the ABS 30-30. Although the waveguide is shown having a greater width in the cross-track direction than a back end 11c of second metal layer, the second metal layer 11 may have a larger cross-track width than that of waveguide 10 in other embodiments. Note that the waveguide extends to a back end of the slider (not shown) on which the TAMR head is formed. A portion of second metal layer top surface 11e2 is formed above the metal peg 12, but the bulk of the top surface 11e1 is not above the first metal layer. Two sides 11b of the second metal layer extend from the back end toward the ABS at essentially 90 degree angles and each side 11b connects with a curved side 11d that terminates in a front end 11t above the metal peg. The front end is substantially narrower than the back end in order to concentrate plasmon energy on the metal peg. The front end is recessed from the ABS by a distance n of 5 to 150 nm. An optional back end PG section has a rectangular shape and is bounded by sides 11b and formed between plane 5-5 and the back end 11c.

Figure 2:
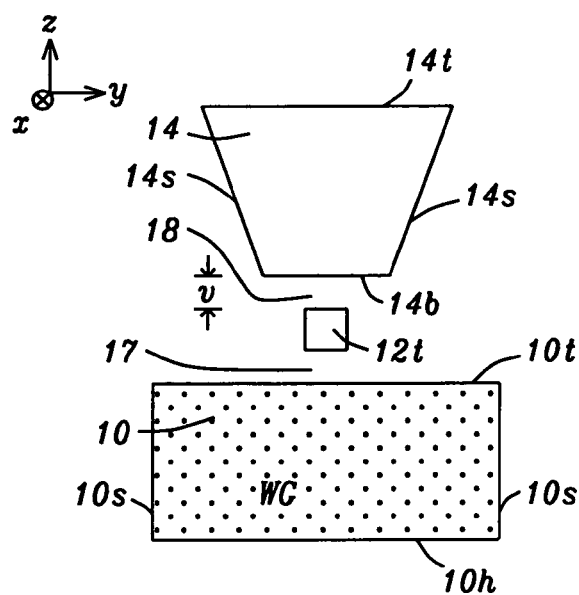
FIG. 2 is an ABS view of a TAMR structure with the PG and WG in FIG. 1 and also including a write pole according to a design currently practiced by the inventors.

Referring to FIG. 2, an ABS view is shown of the PG and waveguide structure in FIG. 1. Metal peg tip 12t is formed between a top surface 10t of the waveguide and a leading edge 14b of write pole 14, and typically has a width less than a cross-sectional width of the leading edge. The metal peg tip is not limited to a square shape but may have another polygonal shape such as a trapezoid. Top and bottom surfaces of the metal peg are formed parallel to the waveguide top surface and leading side of the write pole. In one aspect, the write pole has a trapezoidal shape at the ABS with the leading edge having a smaller cross-sectional width than that of the trailing edge 14t. In this case, the leading side of the write pole includes leading edge 14b and extends perpendicular to the ABS toward a back end of the TAMR device. Sidewalls 14s connect top and bottom sides of the write pole. The trailing edge is part of the trailing side of the write pole. The TAMR head including PG tip 12t, waveguide 10, and write pole 14 move in a down-track direction over a magnetic medium (not shown) during a write process. Tip 12t is separated from the write pole by a dielectric gap 18 with thickness v, and is separated from waveguide top surface 10t by dielectric gap 17. As the down-track thickness of tip 12t is decreased, the gap distance v is preferably reduced to maintain a good alignment of the magnetic field from the write pole and optical spot from the metal peg on the magnetic medium.

Figure 3:
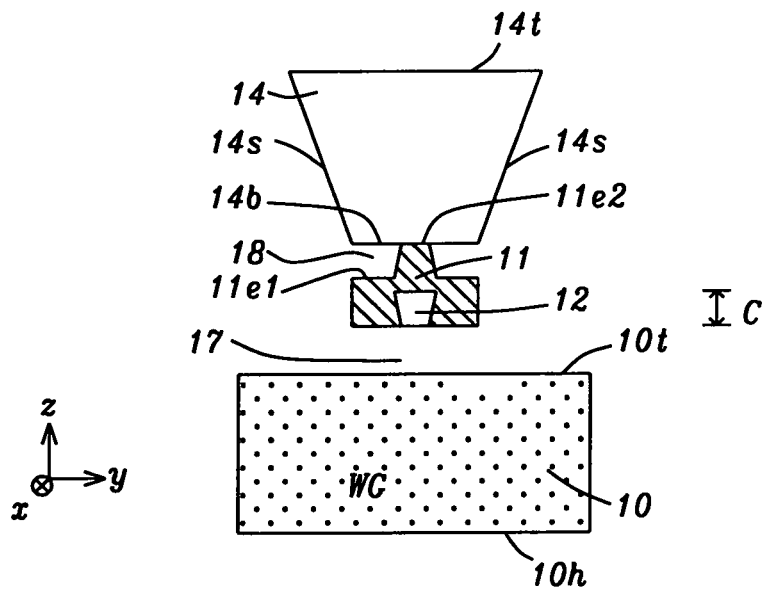
FIG. 3 is a cross-sectional view of the TAMR structure in FIG. 2 at a certain distance from the ABS wherein the PG has a bilayer design.
Figure 4:
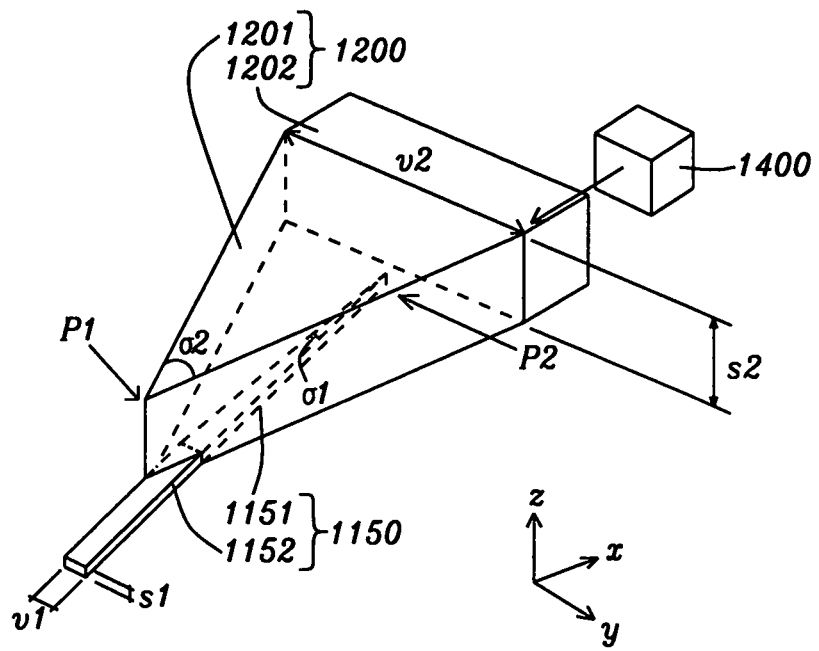
FIG. 4 is an oblique view of a spot size converter having a single secondary waveguide according to a design previously disclosed by the inventors.

In FIG. 3, a cross-sectional view along plane 5-5 in FIG. 1 is illustrated. In some embodiments, top surface 11e2 of the second metal PG layer 11 contacts the leading side 14b of write pole 14 while top surface 11e1 is separated from the write pole by gap 18. Metal peg 12 is shown with a trapezoidal shape and thickness c. The present disclosure also anticipates that a heat sink (not shown) may be formed along the sides 14s and trailing side including edge 14t to compensate for write pole heating caused by contact between metal layer 11 and the write pole. Heat sinks are preferably made of a high thermal conductivity material such as Au, Cu, Cr, Ti, Ta, Ru, Pt, Pd, and SiC.

We have also disclosed a waveguide structure in related U.S. Pat. No. 8,264,919 and depicted in FIG. 4 wherein two waveguide cores 1150, 1200 have a tapered portion 1151 ending in tip P2, and 1201 ending in tip P1, respectively. The tapered portions have tapering angles α1, α2 that are mutually aligned to improve spot conversion efficiency. Light from laser diode 1400 is emitted into first waveguide core section 1202 having width v2 and thickness s2, and is coupled into second waveguide core section 1152 that extends to the ABS where an ABS facing side has thickness s1 and cross-sectional width v1 where v2>v1, and s2>s1. Tips P1 and P2 are essentially sharp points that are difficult to reliably reproduce in practice.

Figure 5:
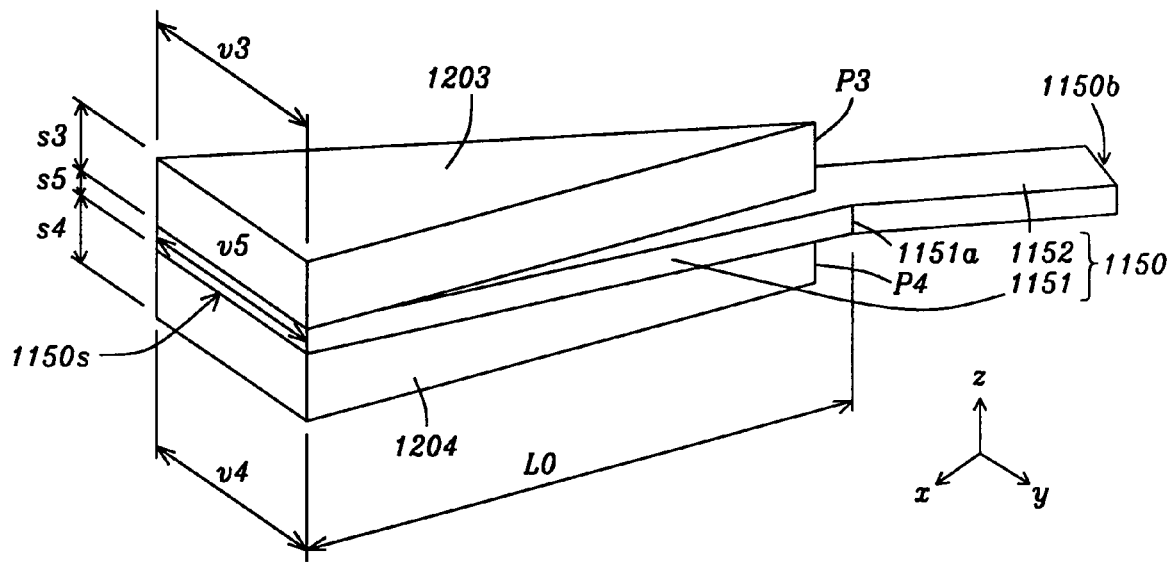
FIG. 5 is an oblique view of a spot size converter having a primary WG sandwiched between two secondary WG according to a design previously disclosed by the inventors.

With regard to FIG. 5 and related U.S. Pat. No. 8,098,547, we have disclosed another waveguide structure in which a central waveguide 1150 has a rectangular section 1152 with tip 1150b at the ABS, and a back section 1151. The back section with back end 1150a having width v5 is symmetrically sandwiched between two triangular shaped spot size converters 1203, 1204 having a thickness s3 and s4, respectively, and a width v3 and v4, respectively, where v3=v4=v5. Dimensions s3, s4 are greater than a thickness v5 of the central waveguide. Again, the spot size converters terminate at sharp points (P3 and P4) that are difficult to fabricate in a reproducible manner.

Herein we disclose additional improvements in our spot size converter design to enable a fabrication sequence with greater process control and higher yields than previously achieved. In particular, various embodiments are described of a waveguide structure wherein at least one secondary waveguide terminates in a ridge having a finite cross-track width and faces the ABS. The secondary waveguide is part of a spot size converter and efficiently couples propagated light from a laser diode into the adjoining primary waveguide proximate to the ABS.

Figure 6:
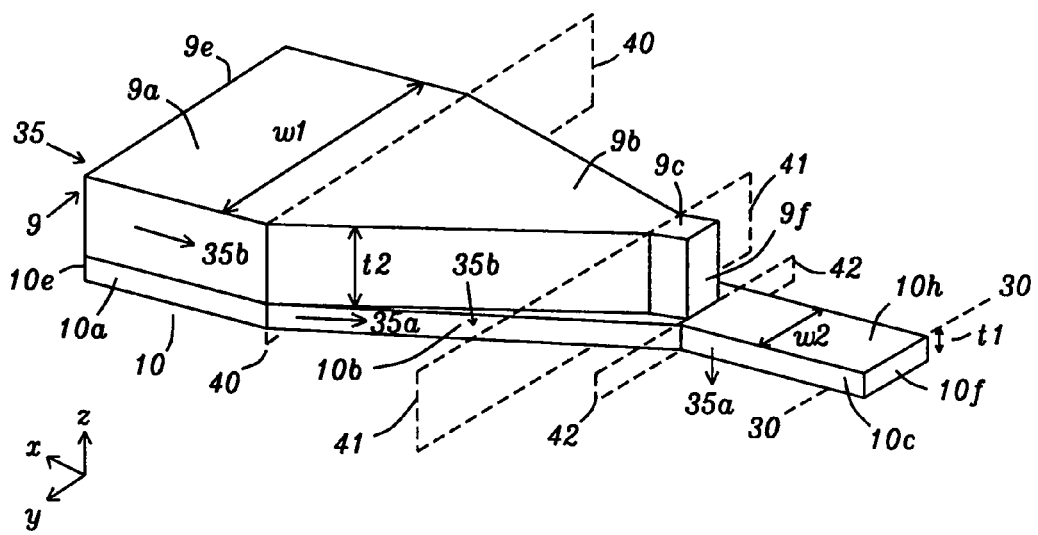
FIG. 6 is an oblique view of a spot size converter in a TAMR device that is formed according to a first embodiment of the present disclosure.

Referring to FIG. 6, a first embodiment of the present disclosure is depicted from an oblique view with surrounding layers removed and features a waveguide structure with a primary waveguide 10, and a secondary waveguide 9 adjoining a first surface thereof. In a preferred embodiment, the first surface corresponds to bottom surface 10h in the TAMR structure shown in FIGS. 2-3 such that the secondary waveguide faces away from the near field transducer (PG). It should be understood the PG structure is not limited to that described in FIGS. 1-3 and may have other near field transducer designs found in the art. In all cases, the PG is formed between the waveguide structure and write pole at the ABS. The waveguides 9, 10 include a core made of $Ta_2O_5$, $HfO_2$, Si, or the like with a high refractive index (RI) and are surrounded by one or more cladding layers (not shown) comprised of a dielectric material such as alumina or silicon oxide. It is important that the refractive index (RI) of the cladding material is less than the RI of the core in order to maintain confined light transmission through the core and facilitate efficient light propagation toward the ABS and to the near field transducer.

A laser diode (not shown) is attached to the back end of the slider on which the waveguide structure is formed, and emits light 35 captured by waveguides 9, 10. A TM laser diode with a transverse-magnetic mode is preferably selected to provide light with a wavelength around 800 nm. The width w1 of the waveguides at their respective back ends 9e, 10e is dictated by the size of the light spot emanating from the laser diode whose emitting facet faces the back of the slider. Likewise, the thickness t2 of waveguide 9, and t1 of waveguide 10 is chosen so that t1+t2 is on the order of the laser spot size (approximately 1 micron or 1000 nm) in the down-track dimension. Light 35a from WG 10 is evanescently coupled to a PG (not shown) that is formed on a side of WG 10 that faces away from WG 9.

Figure 7:
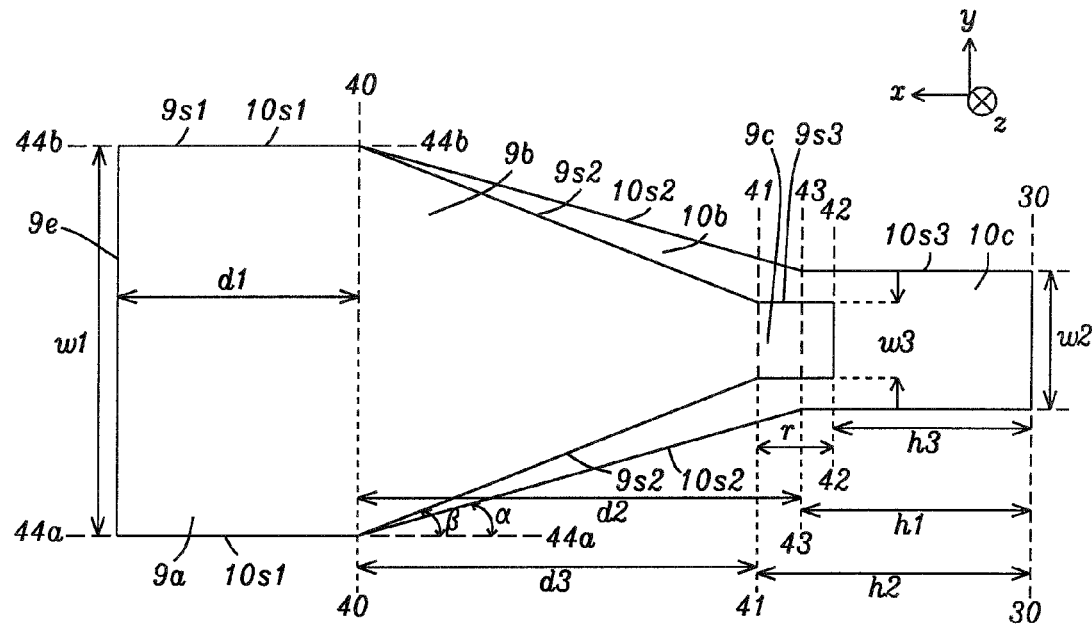
FIG. 7 is top-down view along a down-track direction of the spot size converter in FIG. 6 that shows a secondary waveguide overlaid on a primary waveguide.

According to one embodiment, the primary waveguide 10 has three sections 10a, 10b, and 10c wherein the back end section 10a is rectangular shaped with sides 10s1 aligned orthogonal to back end 9e (and 10e) and with a front side at plane 40-40 that is a distance d1 from 1 micron to tens of microns from the back end as shown in FIG. 7. In other embodiments (not depicted), back end sections 10a and 9a may be omitted such that plane 40-40 is at the back end of the slider. There is a middle section 10b having two tapered sides 10s2 each formed at an angle α with respect to a plane 44a-44a or 44b-44b (that includes side 10s1) and is aligned orthogonal to the ABS 30-30. The tapered sides converge toward one another until reaching a plane 43-43 that is parallel to the ABS and a first height (h1) therefrom. Sides 10s2 are separated by a cross-track distance w2 at plane 43-43. There is a taper distance d2 on the order of tens of microns along the x-axis direction between plane 40-40 and plane 43-43. Front end section 10c is rectangular shaped with sides 10s3 separated by distance w2 and with a front side 10f at the ABS and may correspond to WG 10 in FIGS. 1-4. In some embodiments, w2 is maintained between 400 nm and 800 nm.

In the exemplary embodiment shown in FIGS. 6-7, secondary waveguide 9 has three sections 9a, 9b, 9c where a back end section 9a is preferably aligned with back end section 10a such that sides 9s1 and sides 10s1, respectively, are along a plane 44a-44a or 44b-44b, and section 9a extends a distance d1 in the x-axis direction to plane 40-40. A middle section 9b contacts middle section 10b and has two sides 9s2 that converge toward one another with increasing distance from plane 40-40 until reaching plane 41-41 where the two sides are separated by a cross-track distance w3. Side 9s2 has a taper angle β with respect to plane 44a-44a (or 44b-44b) where β>α. Since middle section 9b has sides with a greater taper angle than in middle section 10b, the taper distance d3 for middle section 9b is less than d2 for section 10b. It is important that the terminal width w3 of the secondary waveguide is sufficiently small to guarantee no propagating waveguide modes are supported at the end of the taper at plane 41-41. Therefore, essentially all of the propagated light 35b in section 9b is funneled into the primary waveguide section 10b to be coupled with light 35a from section 10a. Then, propagated light 35a in sections 10b, 10c is evanescently coupled to the near field transducer (not shown) that is configured to convert the propagated light to plasmon energy that is evanescently coupled to a magnetic medium at the ABS.

A key feature of the present disclosure is the third section 9c (ridge) of the secondary waveguide that extends from a back side at plane 41-41 towards the ABS and terminates at front side 9f, which is recessed a third height (h3) from the ABS. Preferably, the ridge has a constant cross-track width w3 of 50 to 170 nm between sides 9s3 that are formed orthogonal to the ABS and to plane 42-42. A w3 below 50 nm is difficult to reproduce because of the current limitations of photolithography techniques that are used to pattern small feature sizes. A ridge 9c is necessary because a front end of waveguide 9 at plane 41-41 cannot be reliably produced due to tapered sides 9s2 and process variations controlling the location of the secondary WG front end in the x-axis direction. Therefore, including a ridge 9c having constant width and sufficient length r allows variations in placement of front end 9f that will not affect w3 at plane 41-41. Although front side 9f is shown aligned along plane 42-42, the front side may optionally be placed between plane 41-41 and plane 42-42, or between plane 42-42 and the ABS 30-30.

Figure 10:
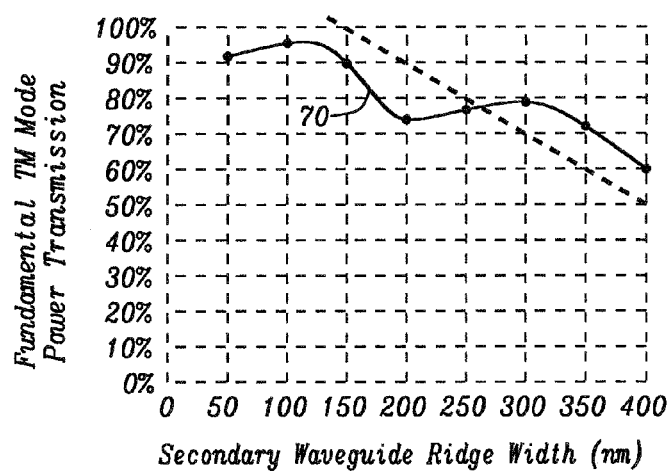
FIG. 10 is a plot showing coupling efficiency of propagated light as a function of ridge cross-sectional width in a secondary waveguide formed according to an embodiment of the present disclosure.

As shown in FIG. 10 and described in a later section, fundamental TM transmission coupling efficiency of light 35b into WG 10 decreases substantially as w3 values increase above a certain value depending on other dimensions in the waveguide structure. By maintaining terminal width w3 in the range of 50 to about 170 nm, coupling efficiency is kept at or above 90%. The lengthwise dimension r of the ridge is from 0.1 micron to about 5 microns and is of sufficient length such that typical process variations including overlay misalignment of WG 10 on WG 9 will not shift front side 9f to plane 41-41.

The spot size converter disclosed herein comprises secondary waveguide section 9b and primary waveguide section 10b since these waveguide portions are responsible for narrowing the cross-track width of the propagated light on approach to the ABS. However, in a broader sense, the ridge 9c is included in the spot size converter structure because the ridge is an extension of the front side of the middle section 9b and is necessary for maintaining the terminal width w3 at plane 41-41. Likewise, primary waveguide section 10c may be considered part of the spot size converter design since it is an extension of a front side of middle section 10b and is critical for maintaining width w2 between plane 43-43 and the ABS 30-30.

Advantages of the present disclosure over state of the art spot size converters are that the secondary waveguide terminal ridge width, and the cross-track and x-axis misalignments between primary and secondary waveguides are insensitive to standard process variations. For example, in FIG. 10, fundamental TM mode power transmission (electric field polarization is along the down-track direction) is plotted on curve 70 as a function of secondary waveguide ridge width (w3 in FIG. 7b) with a free space working wavelength of 808 nm. In this study, w1=4000 nm, t1=400 nm, t2=800 nm, d2 is 70 microns, d3 is 66 microns, r=4 microns, w2=600 nm, α=1.4 degrees and β=1.6 degrees. We have found the ridge width may be varied within a wide process window between 50 nm and about 170 nm without degrading TM transmission coupling efficiency below 90% from WG 9 to WG 10. Furthermore, there is a tolerable variation of 100±20 nm to maintain a maximum TM mode transmission frequency of about 95%. As noted previously, ridge 9c has an x-axis dimension r that is typically greater than normal misalignment of WG 9 on WG 10 in the x-axis dimension and thereby maintains high coupling efficiency of transmitted light from section 9b to section 10b.

Figure 8:
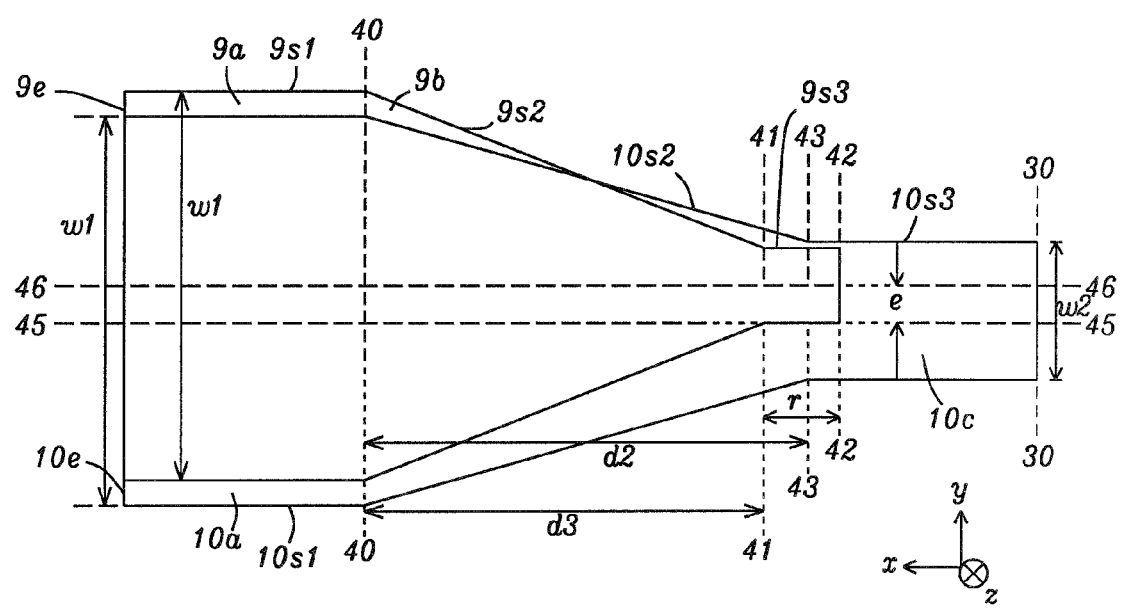
FIG. 8 is another top-down view of the spot size converter in FIG. 7 wherein the secondary WG has a slight misalignment in the cross-track direction on the primary WG.
Figure 11:
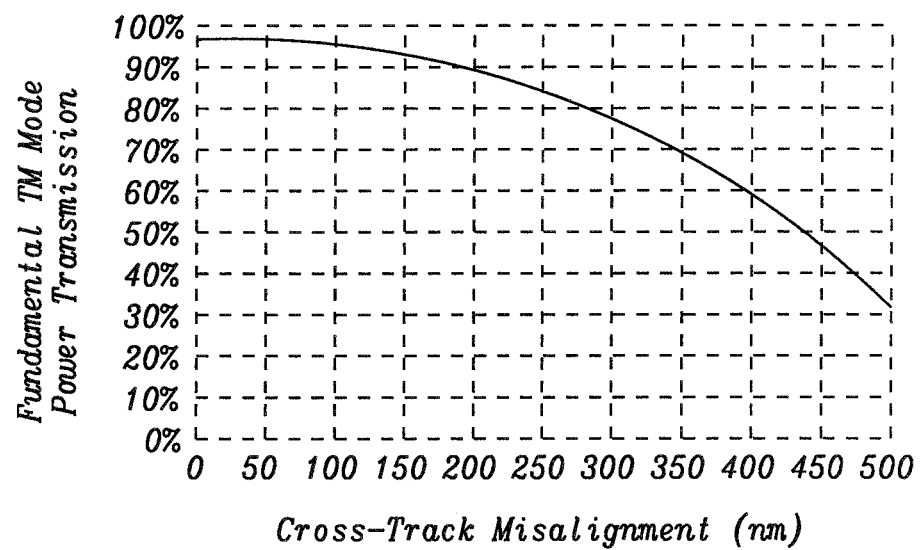
FIG. 11 is a plot showing the effect of cross-track misalignment in FIG. 8 on the light coupling efficiency of the spot size converter in FIG. 6.

Referring to FIG. 8, a top-down view depicts y-axis misalignment of secondary waveguide 9 on primary waveguide 10 that may occur during a typical process. Center plane 46-46 that bisects WG 9 in a lengthwise direction, and is formed orthogonal to the ABS 30-30, is offset a distance e in a cross-track direction with respect to center plane 45-45 that bisects WG 10 in a lengthwise direction. The waveguide dimensions used in the study are the same as stated in the previous paragraph. Additionally, w3 is fixed at 100 nm in this example while e is varied. As indicated in FIG. 11, due to the substantial taper length d2 and d3 of waveguides 10 and 9, respectively, and the ridge width, cross-track misalignment as large as 150 nm is tolerated, well within normal y-axis offsets, while maintaining TM mode transmission coupling efficiency above 90%.

Figure 9:
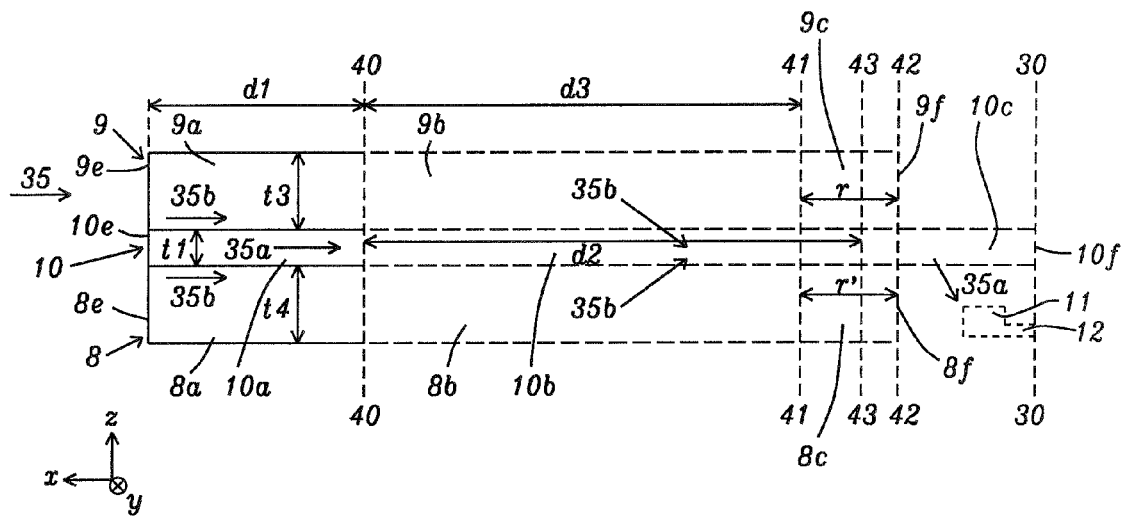
FIG. 9 is a down-track cross-sectional view of a spot size converter having a primary WG sandwiched between two secondary waveguides according to a second embodiment of the present disclosure.

According to a second embodiment illustrated in the down-track cross-sectional view in FIG. 9 taken along plane 44a-44a, the spot size converter may comprise two secondary waveguides 8, 9 with a primary waveguide 10 therebetween. In the exemplary embodiment, end 9e of WG 9 is aligned above end 10e, and end 8e of WG 8 is aligned below end 10e. Preferably, WG 8 is aligned directly below WG 9 such that a side of each back section 8a, 9a, respectively, is formed along plane 44a-44a and plane 44b-44b shown in FIG. 7. In other words, FIG. 7 also represents a top-down view of the second embodiment wherein secondary WG 8 is completely hidden below primary waveguide 10. Back end sections 8a, 9a, 10a are optional and the back end of the waveguide structure may be formed at plane 40-40.

Returning to FIG. 9, light 35 from a laser diode enters a back side of the waveguide structure wherein a portion 35a thereof propagates from a back end 10e toward the ABS 30-30. Meanwhile, portions 35b in waveguides 8, 9 propagate through back end sections 8a, 9a, respectively, and then into middle sections 8b, 9b. The spot size converter of this embodiment comprises the middle sections of secondary waveguides 8, 9, and front sections (ridges) 8c, 9c, respectively. Preferably, light portions 35b are coupled into propagated light 35a in primary waveguide section 10b before reaching plane 41-41. This coupling is accomplished by tapering the secondary waveguides to a terminal width w3 for WG 9 and w3' for WG 8 that do not support propagation of light beyond plane 41-41. In some cases w3=w3' but w3 is not necessarily equal to w3'. Thereafter, a substantial portion of propagated light 35a is evanescently coupled into a near field transducer (PG) with metal layer 11 on peg 12, for example, that extends to the ABS and is configured to convert the propagated light to plasmon energy that is evanescently coupled onto a magnetic medium during a write process as explained previously. Although the PG is shown between WG 8 and the ABS, the PG may be placed in other positions above or below WG 10, and between plane 42-42 and the ABS. Thus, the PG and write pole may be formed on the same side of WG 10 as WG 8, or on the same side of the primary waveguide as WG 9 at the ABS.

Dimensions d1-d3 are retained from the first embodiment as are the positions of plane 40-40 (marking a back end of the tapered sections), plane 41-41 (marking the front end of tapered sections 8b, 9b), plane 43-43 (front end of tapered section 10b), and plane 42-42 (position of front ends 8f, 9f of ridges in sections 8c, 9c). Moreover waveguides 8, 9, 10 have a thickness t4, t3, t2, respectively, where t2+t3+t4 is a total thickness of the waveguide structure and is approximately equal to the spot size in a down-track direction of light 35 that impinges on a back end of the waveguide structure. In some cases, t3=t4, but in alternative embodiments, the thickness of WG 8 may be unequal to that of WG 9. In the exemplary embodiment, both front ends 8f, 9f are at a third height (h3) from the ABS 30-30 although this condition is not necessary for a high performance waveguide structure. Ridges 8c, 9c have a lengthwise dimension r' and r, respectively, between plane 41-41 and plane 42-42 of about 100 nm to 5 microns, and r may be unequal to r'. Because formation of the spot size converter of the second embodiment requires additional manufacturing steps than the first embodiment, a single secondary waveguide may be preferred from a production cost standpoint.

The present disclosure is also a method of fabricating a waveguide structure comprising a spot size converter as described herein. In particular, the manufacturing sequence of the exemplary embodiment involves depositing a secondary WG layer on cladding layer 7 such as $Al_2O_3$ or silicon oxide. The secondary WG layer is patterned by a sequence of steps to form three sections in which the first and second sections have rectangular and tapered shapes, respectively, as described previously with regard to sections 9a, 9b in FIGS. 6-7. The third section has an intermediate shape following an initial patterning step wherein the lengthwise dimension extends all the way to the eventual ABS and beyond, and the cross-track width is substantially greater than the desired terminal width w3. A key feature of the fabrication method is narrowing the secondary waveguide terminal width to w3 in the third section and forming an ABS facing end on a ridge portion thereof that is recessed a third height (h3) from the ABS.

Figure 12A:
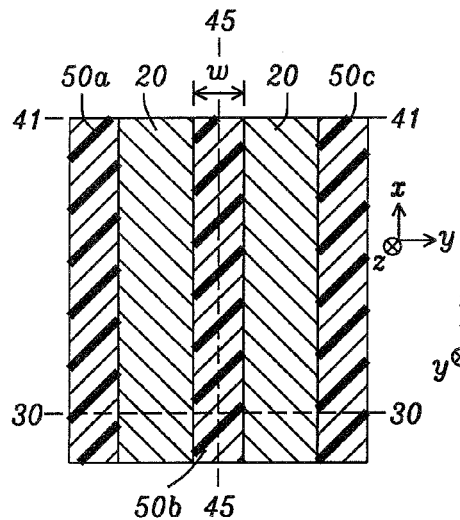

Referring to FIG. 12a, a top-down view of a first step in forming a secondary waveguide ridge of the present disclosure is depicted and shows a metal mask 20 made of RuNiCr or the like formed between plane 41-41 and plane 30-30 and extending beyond plane 30-30 in the x-axis direction. A sputter deposition process may be used to deposit the metal mask. It should be understood that the metal mask also extends toward a back end of the slider and covers the entire unpatterned second waveguide layer. The first and second sections of the secondary waveguide will be patterned and etched simultaneously with the front section. However, the drawings shown hereafter will relate to patterning the key feature that is a ridge in the front section of the secondary waveguide. Note that at this point in the fabrication process, plane 30-30 represents the eventual ABS location. The ABS will not be formed until a lapping process is performed at a back end of the TAMR head fabrication scheme.

A first photoresist layer is coated and patterned on the metal mask by a standard photolithography technique to form a line 50b and leaving a photoresist field with edges 50a, 50c on opposing sides of the line. The line is separated from the field edges by openings that expose portions of metal mask 20. Line 50b has a cross-track width w of about 200 nm and is bisected by center plane 45-45 which bisects the secondary WG in a lengthwise direction.

Figure 12B:
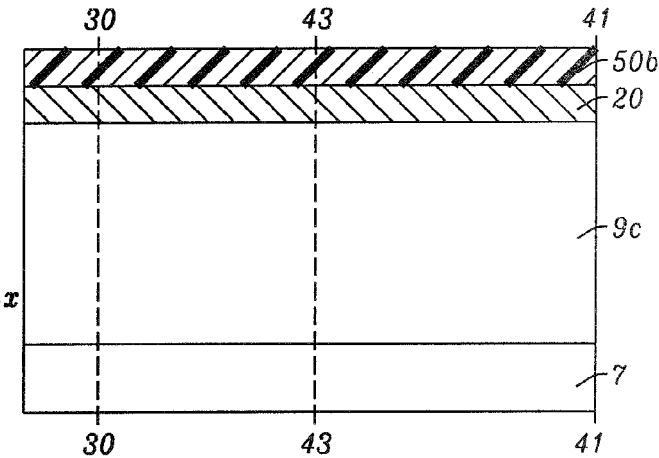

FIG. 12b is a cross-sectional view taken along plane 45-45 in FIG. 12a and depicts bottom cladding layer 7 on a substrate (not shown), intermediate front section 9c of the secondary waveguide formed on the bottom cladding layer, metal mask 20 disposed on front section 9c, and the uppermost line 50b. The location of plane 43-43 where a front side of the primary WG portion of the spot size converter will be formed in a later step is also depicted.

Figure 13A:
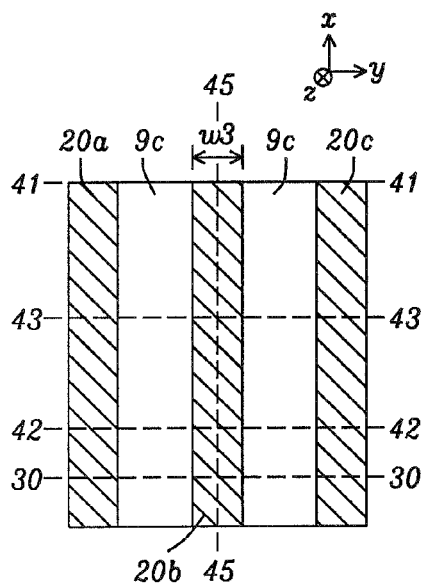

Referring to FIG. 13a, a top-down view is depicted after a reactive ion etch (RIE) process is performed to shrink the cross-track width of line 50b to w3. Thereafter, a ion beam etch (IBE) is employed to transfer the resulting photoresist pattern through exposed portions of metal mask thereby uncovering top surface portions of front section 9c on either side of the middle photoresist line. Then, the photoresist layer is stripped by a conventional method to reveal underlying metal line 20b, and metal field edges 20a, 20c that were previously covered by line 50b, and photoresist field edges 50a, 50c, respectively. Metal line 20b is separated from the metal field edges by openings that expose portions of front section 9c. The metal field edges continue to a back end of the slider and cover portions of the secondary WG layer that are not part of the secondary WG 9, and are separated from secondary WG sections 9a-9c.

Figure 13B:
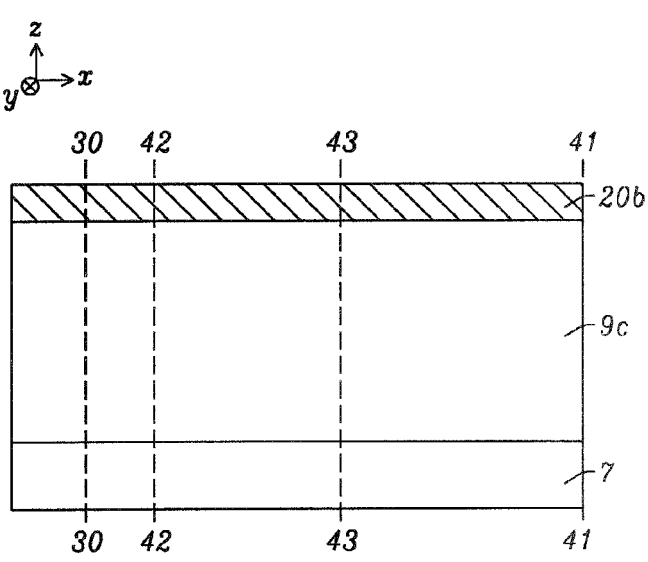

FIG. 13b depicts a view along center plane 45-45 in FIG. 13a. Photoresist line 50b is now removed and metal line 20b is the uppermost layer. Also, plane 42-42 is shown where a front end of front section 9c will be formed in a subsequent process step.

Figure 14A:
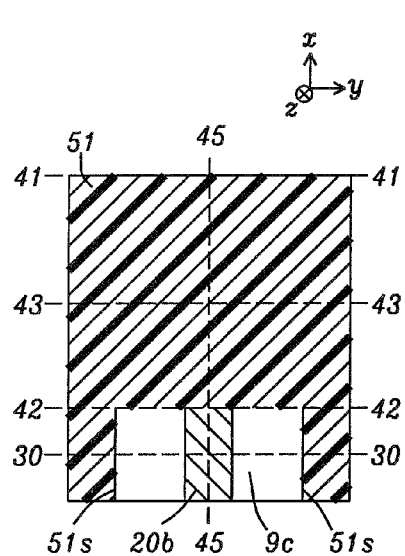

In FIG. 14a, a top-down view of the intermediate structure in FIG. 13a is depicted after a second photoresist layer is coated and patterned to give a rectangular shaped opening bounded by sides 51s and plane 42-42 wherein the opening exposes a front portion of metal line 20b and adjacent regions of front end section 9c. Front portion is defined to mean regions proximate to plane 30-30, and on either side of the eventual ABS. Note that metal field edges 20a, 20c, and portions of metal line 20b and front end section 9c are covered by photoresist layer 51 behind plane 42-42.

Figure 14B:
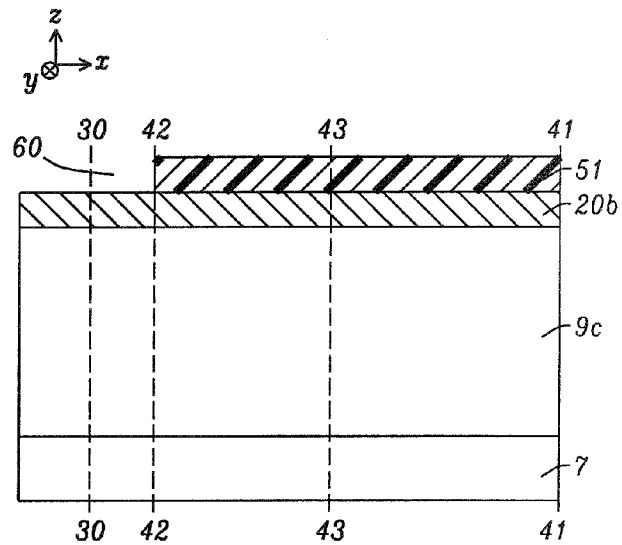

FIG. 14b shows a cross-sectional view along plane 45-45 in FIG. 14a and features an opening 60 in photoresist layer 51 that exposes a top surface of metal line 20b in front of plane 42-42.

Figure 15A:
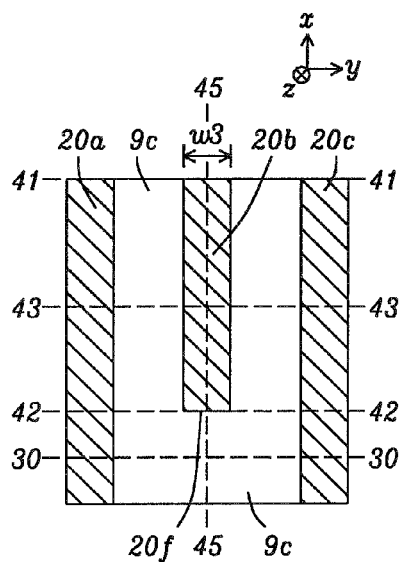

In FIG. 15a, the intermediate structure from FIG. 14a is shown after an IBE process is employed to remove the exposed portion of metal line 20b. As a result, a front end 20f is formed on the metal line at plane 42-42. After the second photoresist layer is removed by a standard method, front end section 9c is exposed between metal field edges 20a, 20c in front of plane 42-42.

Figure 15B:
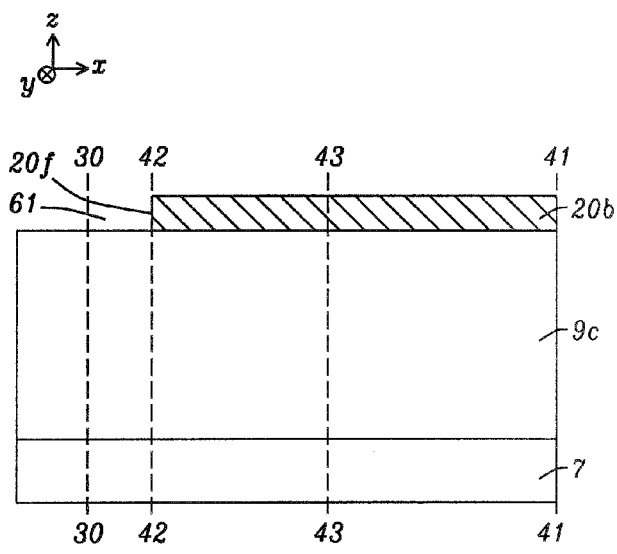

FIG. 15b shows the intermediate structure in FIG. 14b after opening 60 is extended with an IBE process through metal line 20b thereby producing an opening 61 that exposes a top surface of front section 9c in front of plane 42-42.

Referring to FIG. 16a, a third photoresist layer is coated and patterned to form field edges 52 overlaid on metal field edges 20a, 20c. An opening in the photoresist layer exposes metal line 20b and surrounding portions of front section 9c. The opening extends to a back end of the slider, and surrounds a portion of photoresist layer having the desired shape of the first and second sections 9a, 9b from a top-down view (not shown). Thereafter, a RIE process is used to transfer the opening through exposed regions of front section 9c (and sections 9a, 9b) and stopping on bottom cladding layer 7. The third photoresist layer is stripped. Metal line 20b remains intact, and a portion of metal mask 20 above sections 9a, 9b.

In FIG. 16b, the intermediate structure in FIG. 16a is shown from a perspective along plane 45-45. Opening 62 is shown in front of plane 42-42 and exposes a top surface it of bottom cladding layer 7 on front and back sides of plane 30-30. Furthermore, front end 9f is aligned below front end 20f on center metal line 20b.

Referring to FIG. 17a, a cladding layer 19 made of alumina, $SiO_2$, or another dielectric material is deposited to fill opening 62. Next, a chemical mechanical polish (CMP) process is performed to remove the remaining metal fields 20a, 20c surrounding front section 9c (and sections 9a, 9b) and form a planar top surface such that top surface 9t of front section 9c (and sections 9a, 9b) is coplanar with top surface 19t of the cladding layer as shown in the side view in FIG. 17b. Note that a field defined by edges 9s of the secondary waveguide layer remains along side regions of the top-down view in FIG. 17a. However, this field is not connected to the spot size converter and is inactive in the light propagation function.

Figure 18:
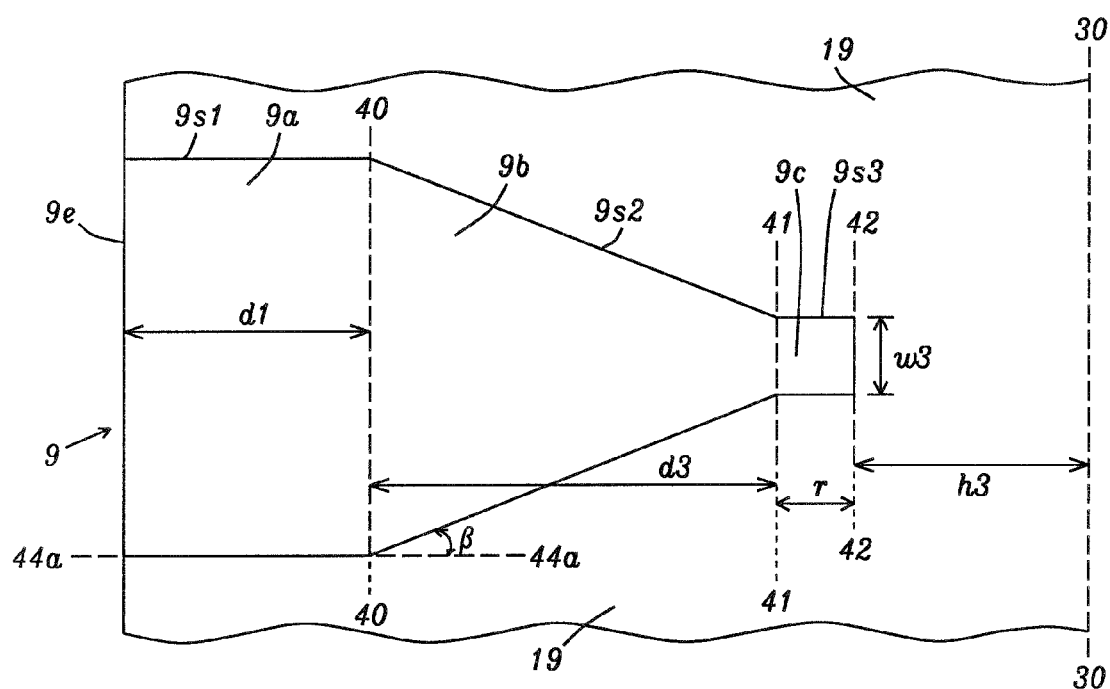
FIG. 18 is a top-down view of the spot size converter in FIG. 6 during an intermediate process step according to an embodiment of the present disclosure.

FIG. 18 depicts a top-down view of the entire secondary WG structure 9 following the CMP process. Cladding layer 19 adjoins sides $9s1$-$9s3$.

Thereafter, a conventional sequence of steps is followed to form the remainder of the TAMR head. According to a preferred process, the primary WG 10, PG, and write pole are sequentially formed on WG 9. Finally, a lapping process is performed on the slider to establish the ABS 30-30 and remove all material on a side of the ABS that is opposite the secondary WG 9. The overall ridge formation sequence in the secondary waveguide structure is compatible with existing magnetic head fabrication techniques. As indicated previously, the dimensions of the secondary waveguide sections, and in particular the terminal width w3 of the ridge 9c are easily reproduced to provide higher yields of devices having high TM mode transmission efficiency explained previously with respect to FIGS. 10-11.

While this disclosure has been particularly shown and described with reference to, the preferred embodiment thereof, it will be understood by those skilled in the art that various changes in form and details may be made without departing from the spirit and scope of this disclosure.

We claim:

1. A thermally assisted magnetic recording (TAMR) head formed on a slider and having a waveguide structure with a spot size converter for propagating light toward an air bearing surface (ABS) where the light is evanescently coupled to a near field transducer that is configured to convert the propagated light to plasmon energy that is evanescently coupled to a magnetic medium to facilitate a write process, the spot size converter comprises:

(a) a primary waveguide with a back end that captures light from a laser diode and extends to a front end at the ABS, the primary waveguide has a down-track thickness t1 between a top surface and bottom surface and comprises;

(1) a first tapered section with a back side at a first plane that is parallel to the ABS, the back side has a cross-track width w1, and a front side at a second plane formed parallel to the ABS and having a cross-track width w2 where w2<w1, the first tapered section has two sides extending a taper distance d2 from the first plane to the second plane and each formed at a taper angle α with respect to a plane aligned orthogonal to the ABS; and (2) a front section having width w2 and formed between the second plane and the ABS, the front section couples light to the near field transducer; and (b) a secondary waveguide with a thickness t2 that contacts the top or bottom surface of the primary waveguide, the secondary waveguide comprises:

(1) a second tapered section having a back side with width w1 at the first plane, and a front side at a third plane formed parallel to the ABS, the front side at the third plane has a width w3 where w3<w2 and is a taper distance d3 from the first plane where d3<d2, the second tapered section has two sides each extending from the first plane to the third plane and formed at an angle β with respect to one of the planes aligned orthogonal to the ABS where β>α; and (2) a ridge having the width w3 and extending from a back side at the third plane to a front side that is recessed a first height from the ABS.

2. The TAMR head of claim 1 wherein each of the primary waveguide and secondary waveguide are further comprised of a back section having cross-track width w1 and extending a distance d1 between a back end of the slider and the first tapered section and second tapered section, respectively, at the first plane.

3. The TAMR head of claim 1 wherein w3 is about 50 to 170 nm.

4. The TAMR head of claim 1 wherein t1+t2 is about equal to a down-track dimension of a spot size of the light from the laser diode.

5. The TAMR head of claim 1 wherein w2 is about 400 nm to 800 nm.

6. The TAMR head of claim 1 wherein the ridge extends a distance of about 100 nm to 5 microns from the third plane to the front side.

7. The TAMR head of claim 1 wherein the near field transducer is formed between a top surface of the primary waveguide and a write pole at the ABS, and the secondary waveguide adjoins the bottom surface of the primary waveguide.

8. The TAMR head of claim 1 wherein the front side of the ridge is formed between the second plane and the ABS, or between the first plane and the second plane.

9. A thermally assisted magnetic recording (TAMR) head formed on a slider and having a waveguide structure with a spot size converter for propagating light toward an air bearing surface (ABS) where the light is evanescently coupled to a near field transducer that is configured to convert the propagated light to plasmon energy that is evanescently coupled to a magnetic medium to facilitate a write process, the spot size converter comprises:

(a) a primary waveguide with a back end that captures light from a laser diode and extends to a front end at the ABS, the primary waveguide has a down-track thickness t1 between a top surface and bottom surface and comprises;

(1) a first tapered section with a back side at a first plane that is parallel to the ABS, the back side has a cross-track width w1, and a front side at a second plane formed parallel to the ABS and having a cross-track width w2 where w2<w1, the first tapered section has two sides extending a taper distance d2 from the first plane to the second plane and each formed at a taper angle α with respect to a plane aligned orthogonal to the ABS; and (2) a front section having width w2 and formed between the second plane and the ABS, the front section couples light to the near field transducer;

(b) a first secondary waveguide with a thickness t2 that contacts the top surface of the primary waveguide, the first secondary waveguide comprises:

(1) a second tapered section having a back side with width w1 at the first plane, and a front side at a third plane formed parallel to the ABS, the front side at the third plane has a width w3 where w3<w2 and is a taper distance d3 from the first plane where d3<d2, the second tapered section has two sides each extending from the first plane to the third plane and formed at an angle β with respect to one of the planes aligned orthogonal to the ABS where β>α; and (2) a first ridge having width w3 and extending a distance r from the front side of the second tapered section at the third plane toward the ABS, the ridge has a front side recessed from the ABS; and (c) a second secondary waveguide with a thickness t3 that contacts the bottom surface of the primary waveguide, the second secondary waveguide comprises:

(1) a third tapered section having a back side with width w1 at the first plane, and a front side at the third plane formed parallel to the ABS, the front side at the third plane has a width w3' where w3'<w2 and is a taper distance d3 from the first plane, the third tapered section has two sides each extending from the first plane to the third plane and formed at an angle β with respect to one of the planes aligned orthogonal to the ABS; and (2) a second ridge having width w3' and extending a distance r' from the front side of the third tapered section at the third plane toward the ABS, the second ridge has a front face recessed from the ABS.

10. The TAMR head of claim 9 wherein each of the primary waveguide, first secondary waveguide, and second secondary waveguide are further comprised of a back section having cross-track width w1 and extending a distance d1 between a back end of the slider and the first tapered section, second tapered section, and third tapered section, respectively, at the first plane.

11. The TAMR head of claim 9 wherein w3 and w3' are from about 50 to 170 nm.

12. The TAMR head of claim 9 wherein t1+t2+t3 is about equal to a down-track dimension of a spot size of the light from the laser diode.

13. The TAMR head of claim 9 wherein w3 is unequal to w3'.

14. The TAMR head of claim 9 wherein r for the first ridge and r' for the second ridge are in a range of 100 nm to 5 microns.

15. The TAMR head of claim 9 wherein the near field transducer is formed between the primary waveguide and a write pole at the ABS.

16. The TAMR head of claim 9 wherein w2 is from about 400 nm to 800 nm.

17. The TAMR head of claim 9 wherein the front sides of the first and second ridges are between the second plane and the ABS, or between the first and second planes.

18. A method of fabricating a spot size converter in a thermally assisted magnetic recording (TAMR) head wherein light is propagated from a laser diode through the spot size converter and is evanescently coupled to a near field transducer that is configured to convert the propagated light to plasmon energy that is evanescently coupled to a magnetic medium to facilitate a write process, comprising:

(a) providing a substrate and a bottom cladding layer thereon;

(b) forming a secondary waveguide that contacts a top surface of the bottom cladding layer, the secondary waveguide has a thickness t2 and comprises:

(1) a first tapered section with a back side having width w1 at a first plane that is parallel to an eventual air bearing surface plane hereafter called the ABS plane, and a front side at a third plane formed parallel to the ABS plane, the front side at the third plane has a width w3 and is a taper distance d3 from the first plane, the first tapered section has two sides each extending from the first plane to the third plane and formed at an angle β with respect to the plane aligned orthogonal to the ABS plane; and (2) a front section extending from the front side of the second tapered section at the third plane to at least the ABS plane, the front section is bisected by a center plane formed orthogonal to the third plane;

(c) forming a metal line having width w3 on the center plane and contacting a top surface of the front section from the third plane to at least the ABS plane;

(d) etching to remove a front portion of the metal line and thereby form a front end thereon that is recessed a first height from the ABS plane;

(e) reactive ion etching to transfer a shape of the metal line through the front section of the secondary waveguide to form a ridge therein with a front side that is recessed the first height from the ABS plane;

(f) performing a chemical mechanical polish (CMP) process to remove the metal line above the ridge; and (g) forming a primary waveguide with a second tapered section between the first plane and a second plane that is parallel to the ABS plane, the second tapered section has two sides each formed at a taper angle α with respect to a plane aligned orthogonal to the ABS where β>α, and contacts a top surface of the first tapered section and propagates light to a front section between the second plane and ABS plane wherein propagated light in the front section is evanescently coupled to the near field transducer.

19. The method of claim 18 wherein the primary waveguide has a thickness t1 between a top surface and bottom surface thereof and comprises:

(1) the second tapered section with a back side having cross-track width w1 at the first plane, and a front side at the second plane and having a cross-track width w2 where w2<w1, and the two sides each formed at the taper angle α and extending a taper distance d2 from the first plane to the second plane; and (2) the front section having width w2 between two sides extending from the second plane to the ABS plane.

20. The method of claim 19 further comprised of lapping the slider to remove any material on an opposite side of the ABS plane with respect to the first, second, and third planes.

21. The method of claim 18 wherein the front side of the secondary waveguide ridge is a distance of about 100 nm to 5 microns from the third plane.

22. The method of claim 18 wherein w3 is from about 50 to 170 nm.

23. The method of claim 18 further comprised of depositing a cladding material in an opening surrounding the ridge before the CMP process is performed.

24. The method of claim 18 wherein t1+t2 is about equal to a down-track dimension of a spot size of the light from the laser diode.

25. The method of claim 18 wherein w2 is from about 400 nm to 800 nm.

26. The method of claim 18 wherein the near field transducer is formed between the top surface of the primary waveguide and a write pole at the ABS, and the secondary waveguide adjoins the bottom surface of the primary waveguide.

* * * * *